I. W. Dean.
Roof.
N° 81,147.          Patented Aug. 18, 1868.
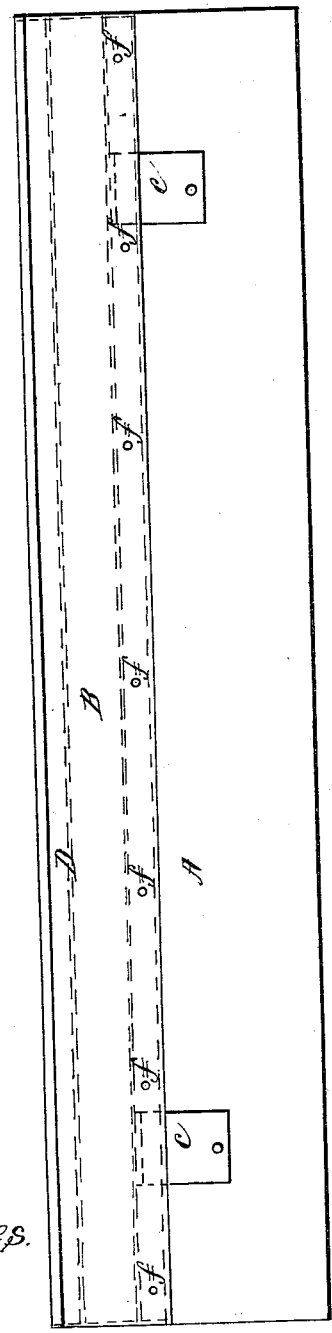
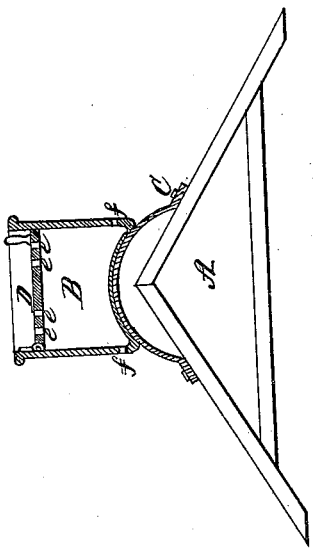
Witnesses.
Inventor.
Isaac W. Dean

United States Patent Office.

ISAAC W. DEAN, OF FRANKLIN, CONNECTICUT.

Letters Patent No. 81,147, dated August 18, 1868.

IMPROVED MODE OF PRESERVING THE ROOFS OF BUILDINGS.

*The Schedule referred to in these Letters Patent and making part of the same.*

TO ALL WHOM IT MAY CONCERN:

Be it known that I, ISAAC W. DEAN, of Franklin, in the county of New London, and State of Connecticut, have invented a new and useful Mode of Preserving Roofs of Buildings; and I do hereby declare the following to be a full, clear, and exact description of the same, reference being had to the accompanying drawing, making part of this specification, in which—

Figure 1 is a side elevation, and

Figure 2 is a section of an apparatus in which my invention may be performed.

Heretofore, shingles for roofs have been saturated with lime and other substances prior to their being laid on the roof. Preserving-substances have also been applied by brushes, and in various other ways, "by hand," to the roof.

My invention consists in applying water from rains or showers in such a manner that said water shall percolate or leach through a preserving-substance, kept in a proper receptacle, at or near the top of the roof, in such a manner that the preserving-material, or the soluble parts thereof, shall run down the roof while it is wet, thus saturating the said roof with the preserving-material whenever it rains, thus forming a cheap, effective, and sure preservative for roofs of buildings.

In the drawing, the same marks of reference indicate like parts in both figures.

A is the roof of a building. B is a trough, which may be made of wood or metal, the trough running the entire length of the roof, and attached to it by means of the stand C C. D is a cover to the trough B, and is placed a short distance from the top, and attached by hinges, so that it may be opened or closed. This cover is perforated with holes $e\ e\ e\ e$, for the purpose of allowing the water to pass down into the trough below.

This trough, B, is perforated with holes $f\ f\ f\ f\ f\ f\ f$, near the bottom. The trough B is also filled or partly filled with lime or any known substance which will preserve wood from decay.

The operation of my invention is as follows: The trough B being filled or partly filled with preserving-material, and the cover D being closed, whenever it rains, the water falls into the trough D, and percolates through the preserving-material, and out through the apertures $f\ f\ f\ f\ f\ f\ f$ to the roof, carrying with it small portions of the material contained in the trough. The roof being wet, it spreads over the entire surface, and saturates it with its soluble parts. Whenever the preserving-material becomes exhausted, it should be renewed, as before. The cover D, while it allows the water to pass down, prevents the wind from blowing out the material while in a dry condition.

I do not claim broadly saturating roofs of buildings with preserving-material.

What I claim as my invention, and desire to secure by Letters Patent, is—

Saturating the roofs of buildings with preserving-material by means of a receptacle, or its equivalent, placed at or near the top of the roof, said receptacle containing the preserving-material, substantially as described and for the purpose specified.

ISAAC W. DEAN.

Witnesses:
ALBERT S. BOLLES,
A. S. ELKINS.